US00RE36443E

United States Patent [19]

Ma et al.

[11] E Patent Number: Re. 36,443

[45] Reissued Date of Patent: Dec. 14, 1999

[54] DIALER WITH INTERNAL OPTION SELECT CIRCUIT PROGRAMMED WITH EXTERNALLY HARDWIRED ADDRESS

[75] Inventors: Herman Ma, Dallas; Darin L. Kincaid, Coppell; David N. Larson, Austin, all of Tex.

[73] Assignee: SGS-Thomson Microelectronics, Inc., Carrollton, Tex.

[21] Appl. No.: 08/903,528

[22] Filed: Jul. 30, 1997

Related U.S. Patent Documents

Reissue of:

[64] Patent No.: 4,896,060
Issued: Jan. 23, 1990
Appl. No.: 08/264,902
Filed: Oct. 31, 1988

U.S. Applications:

[

[63] Continuation of application No. 08/679,314, Jul. 12, 1996, abandoned, which is a continuation of application No. 08/539,423, Oct. 5, 1995, abandoned, which is a continuation of application No. 08/373,887, Jan. 17, 1995, abandoned, which is a continuation of application No. 07/824,851, Jan. 23, 1992, abandoned.

[51] Int. Cl.[6] ..... H03K 19/01; H03K 3/26

[52] U.S. Cl. ..... 326/39; 326/41; 326/47; 379/361

[58] Field of Search ..... 307/303, 303.1, 307/465, 465.1, 482.1; 326/39, 41, 101, 47; 379/31, 100.14, 361

[56] References Cited

U.S. PATENT DOCUMENTS

| | | | |
|---|---|---|---|
| 3,949,370 | 4/1976 | Reyling et al. | 340/172.5 |
| 4,390,754 | 6/1983 | Holberg | 179/84 |
| 4,575,794 | 3/1986 | Veneski et al. | 364/200 |
| 4,598,174 | 7/1986 | Pommer | 179/84 |
| 4,742,252 | 5/1988 | Agrawal | 307/465 |
| 4,746,815 | 5/1988 | Bhatia et al. | 307/465.1 |
| 4,791,602 | 12/1988 | Resnick | 364/900 |
| 4,791,603 | 12/1988 | Henry | 364/900 |
| 4,818,902 | 4/1989 | Brockmann | 307/465 |
| 4,831,573 | 5/1989 | Norman | 364/716 |
| 4,835,414 | 5/1989 | Freidin | 307/243 |
| 5,053,644 | 10/1991 | Shibata et al. | 307/465.1 |
| 5,198,707 | 3/1993 | Nicolai | 307/465 |

FOREIGN PATENT DOCUMENTS

| | | |
|---|---|---|
| A-2 274 087 | 2/1976 | France . |
| A-3 014 732 | 10/1981 | Germany . |

OTHER PUBLICATIONS

Nachrichten Elektronik, vol. 34, No. 11, Nov. 1980, Heidelerg De, pp. 382–286; H. Wesolowski: "Ein mikrocomputergesteuertes Tastwahleltefon."

*Primary Examiner*—Edward P. Westin
*Assistant Examiner*—Richard Roseen
*Attorney, Agent, or Firm*—Seed and Berry LLP

[57] ABSTRACT

An option select circuit for a dialer includes an internal address generator (20) for generating an address pattern, which, in a set up mode, is output from a multiplexer (14) to I/O pins (10). The pins (10) are selectively hardwired through an interface circuit (24) back to address input pins (50) and (52) for input to a decorder (28). The decoder (28) decodes the selected address for input to a PLA (30). This allows selection of various functions in a function generator (12) for operation in the normal dialer mode. The interface circuit (24) comprises hardwire connections (54) and (56).

42 Claims, 4 Drawing Sheets

*Fig. 1*

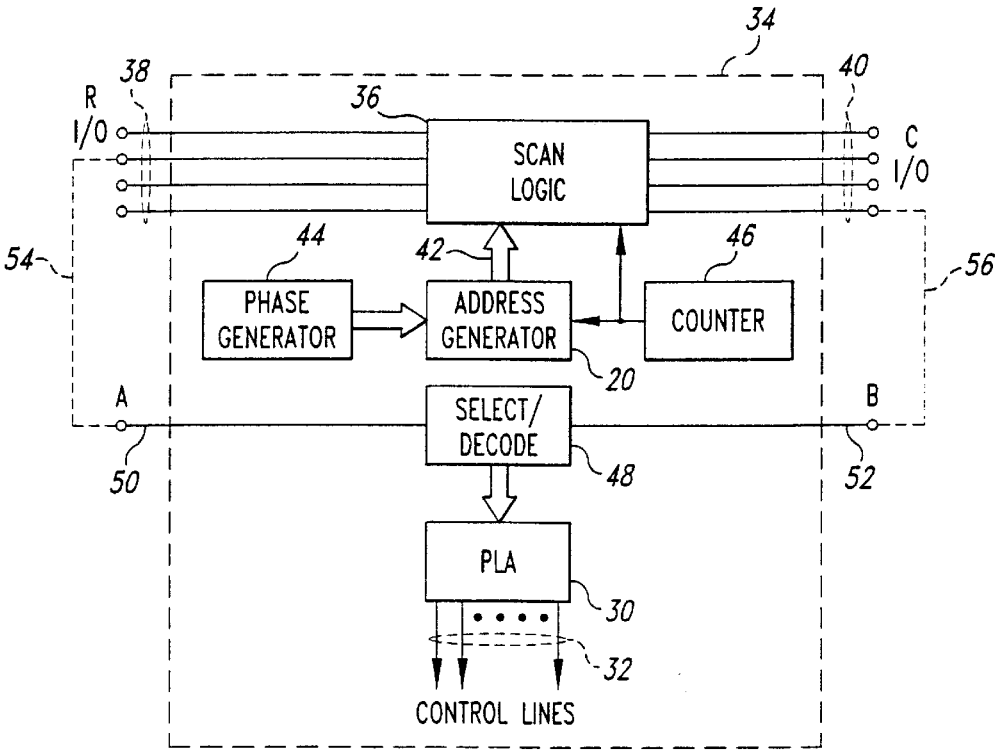
Fig. 2
(Amended)

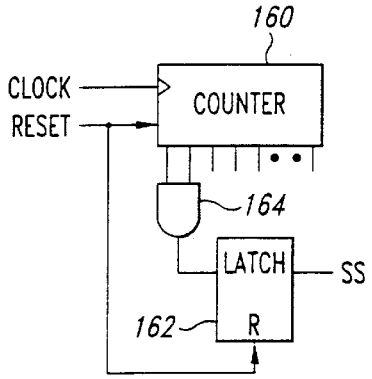
Fig. 7
(Amended)
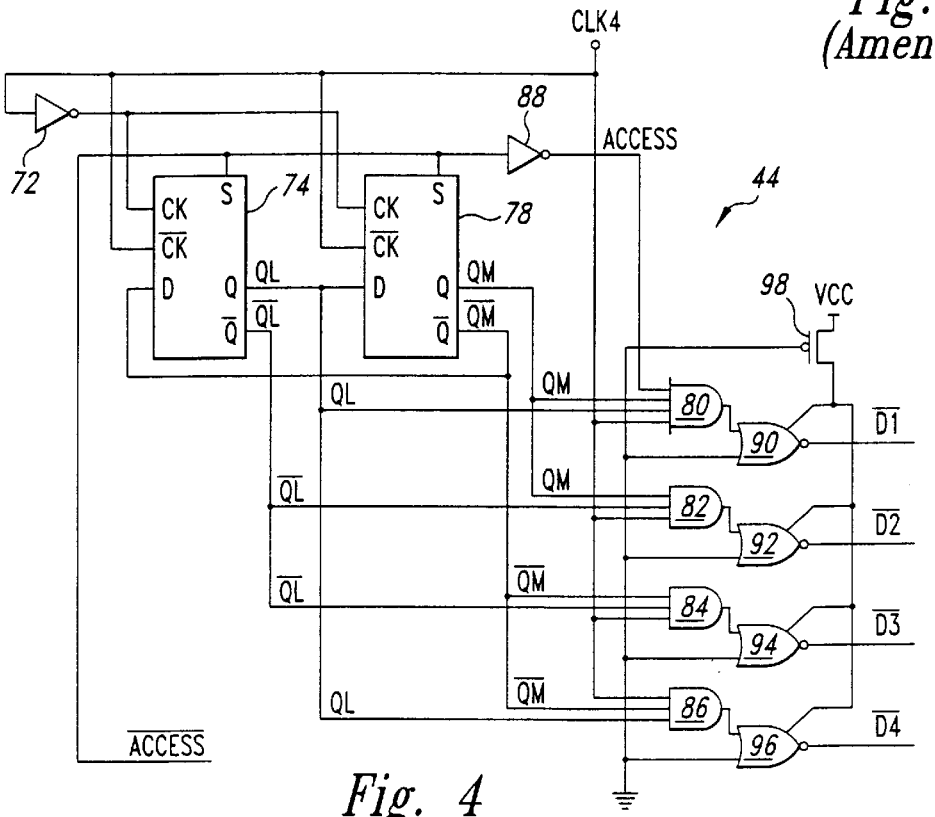
Fig. 4
(Amended)

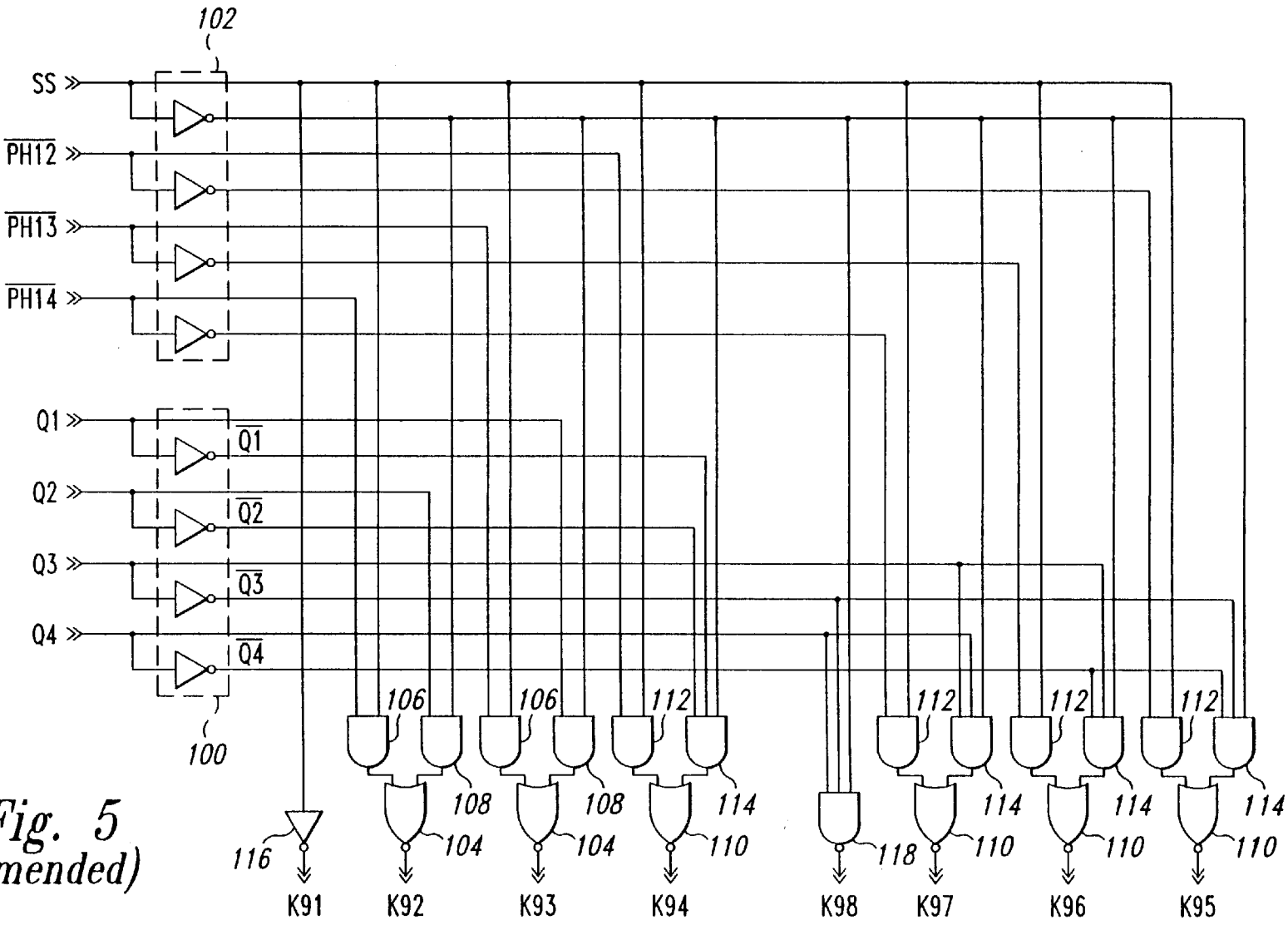
Fig. 5
(Amended)

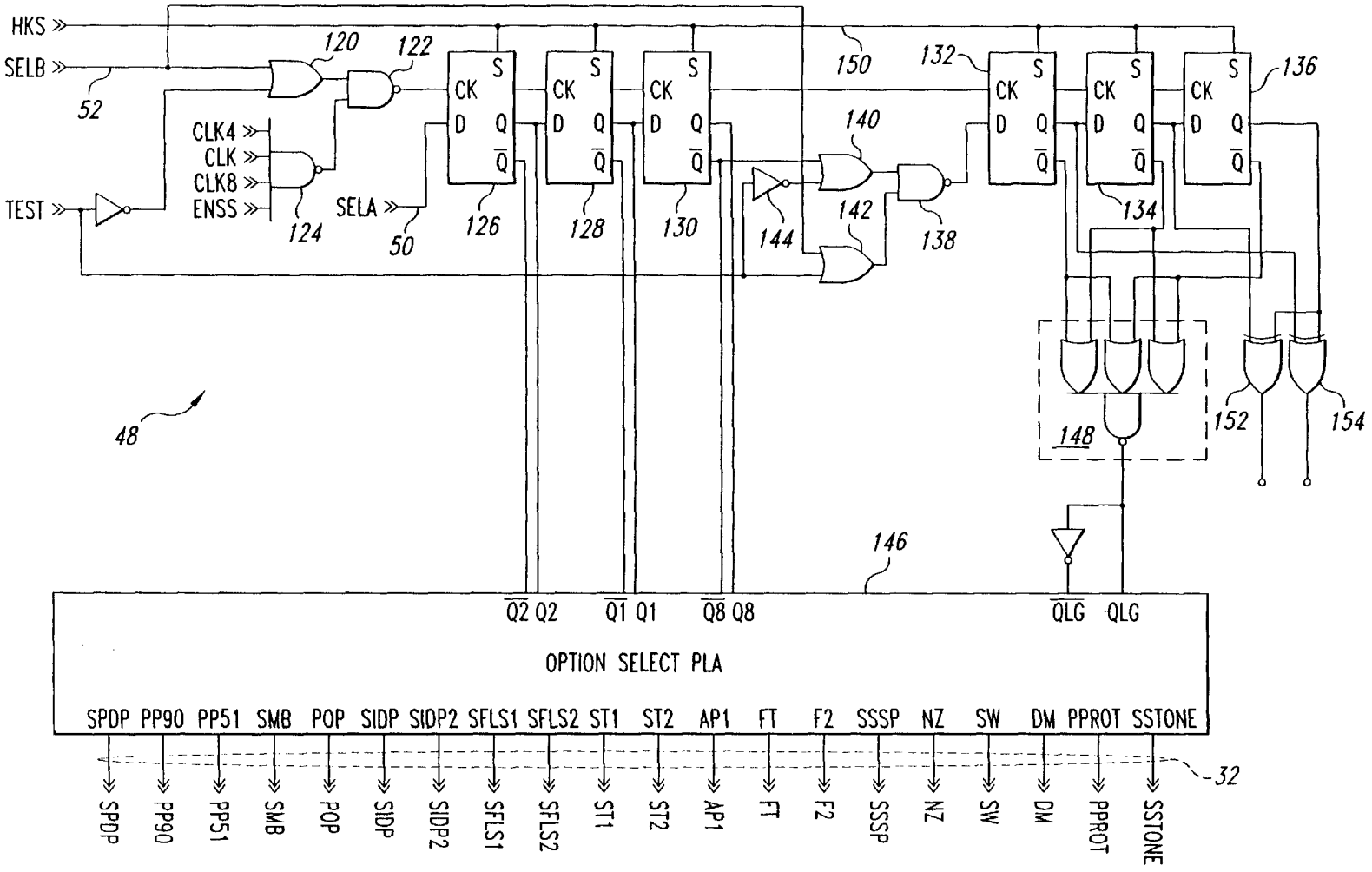
*Fig. 6 (Amended)*

DIALER WITH INTERNAL OPTION SELECT CIRCUIT PROGRAMMED WITH EXTERNALLY HARDWIRED ADDRESS

Matter enclosed in heavy brackets [ ] appears in the original patent but forms no part of this reissue specification; matter printed in italics indicates the additions made by reissue.

*CROSS-REFERENCE TO RELATED APPLICATIONS*

*This application is a continuation of U.S. patent application Ser. No. 08/679,314, filed Jul. 12, 1996, now abandoned, which is a continuation of U.S. patent application Ser. No. 08/539,423, filed Oct. 5, 1995, now abandoned, which application is a continuation of U.S. patent application Ser. No. 08/373,887, filed Jan. 17, 1995, now abandoned, which application is a continuation of U.S. patent application Ser. No. 07/824,851, filed Jan. 23, 1992, now abandoned, which application is a Reissue of U.S. patent application Ser. No. 07/264,902, filed Oct. 31, 1988, which issued as U.S. Pat. No. 4,896,060, which patent has been surrendered.*

TECHNICAL FIELD OF THE INVENTION

The present invention pertains in general to address circuits for addressing an internal PLA and, more particularly, to a multiplexing circuit for internally generating an address and externally connecting the address to an address input for the PLA.

BACKGROUND OF THE INVENTION

Automatic telephone dialer systems provide a specified output on the telephone line in response to depressing telephone keys. However, the output provided by the telephone dialer is a function of a country in which that dialer is used. This output varies for a number of different countries. For example, there are sixteen different dialer formats in the world. This, therefore requires a dialer that is to operate in all countries to be of sufficient versatility to accommodate the different dialing formats. At present, this typically requires a mask-change on a particular chip to provide a dedicated chip for the associated country. This is undesirable from a production stand point and it would be much more desirable to provide a universal chip which could be programmed externally.

When designing with universal logic, some type of programmable logic such as a PLA is normally utilized. The PLA can be programmed to provide a fixed logic function or it can be programmed for multiple functions that are addressable. In the fixed function logic array, the programming is done with a mask change such that a given dialer chip is useful for only a single country after fabrication thereof. An addressable array, on the other hand, provides the ability to have multiple functions on a given chip after fabrication thereof. The disadvantage to the addressable array, however, is the requirement for additional pins to accept the address input and the requirement for an address generator. In view of these disadvantages, there exists a need to select from a number of different functional options without significantly increasing the number of pins.

SUMMARY OF THE INVENTION

The present invention disclosed and claimed herein comprises a programmable control circuit. The control circuit includes a plurality of input/output pins which are interfaced with a function generator and an internal address generator. The address generator is selected by a multiplexer during a set-up mode for interface with the input/output pins and is operable to generate a separate and predetermined serial address for each of the I/O pins. A plurality of address input pins are provided having a number less than the plurality of I/O pins, and are operable to be interfaced with the I/O pins. The address input pins are selectively connected through interface circuitry to a select one of the I/O pins depending upon the desired address. A decoder is provided for decoding the received address on the address input pin and latching this decoded address into the register during the set-up operation. This address is then input to an addressable control signal generator for output of a separate and predetermined function for each decodable address. These control signals are then input to the function generator to provide control inputs therefore. Control circuitry is provided for operating the control circuit in the set-up mode in response to receiving an external set-up signal.

In another embodiment of the present invention, each of the predetermined addresses is a binary address wherein the decoder circuit is operable to receive the serial address and convert it to a parallel address. The control signal generator is a programmable logic array having an address input and a separate and predetermined control output for each decodable address.

In yet another aspect of the present invention, the address generator, function generator, multiplexer, decoder, control signal generator and control circuitry are all enclosed in a single package with the I/O pins and the address input pins providing an interface with the exterior of the package. The interface circuitry is contained exterior to the package and comprises a hardwire connection between each of the address input pins and a select one of the I/O pins.

In yet a further aspect of the present invention, the control circuitry is operable to generate an internal set-up signal in response to receiving an external set-up signal. The internal set-up signal is generated for a predetermined duration of time during which the address generator is interfaced with the I/O pins and the decode circuit is operable to decode the received address. At the end of this duration of time, the decoded address is latched onto the address input of the control signal generator, and then the function generator interfaced with the I/O pins.

BRIEF DESCRIPTION OF THE DRAWINGS

For a more complete understanding of the present invention and the advantages thereof, reference is now made to the following description taken in conjunction with the accompanying [D]*drawings* in which:

FIG. 2 illustrates a more detailed block diagram of the dialer;

FIG. 4 illustrates a logic diagram of the phase generator;

FIG. 5 illustrates a logic diagram of the multiplexing circuit;

FIG. 6 illustrates a logic diagram of the select decoder and PLA; and

FIG. 7 illustrates a logic diagram of the counter circuitry for generating the timing control.

Figure 1:
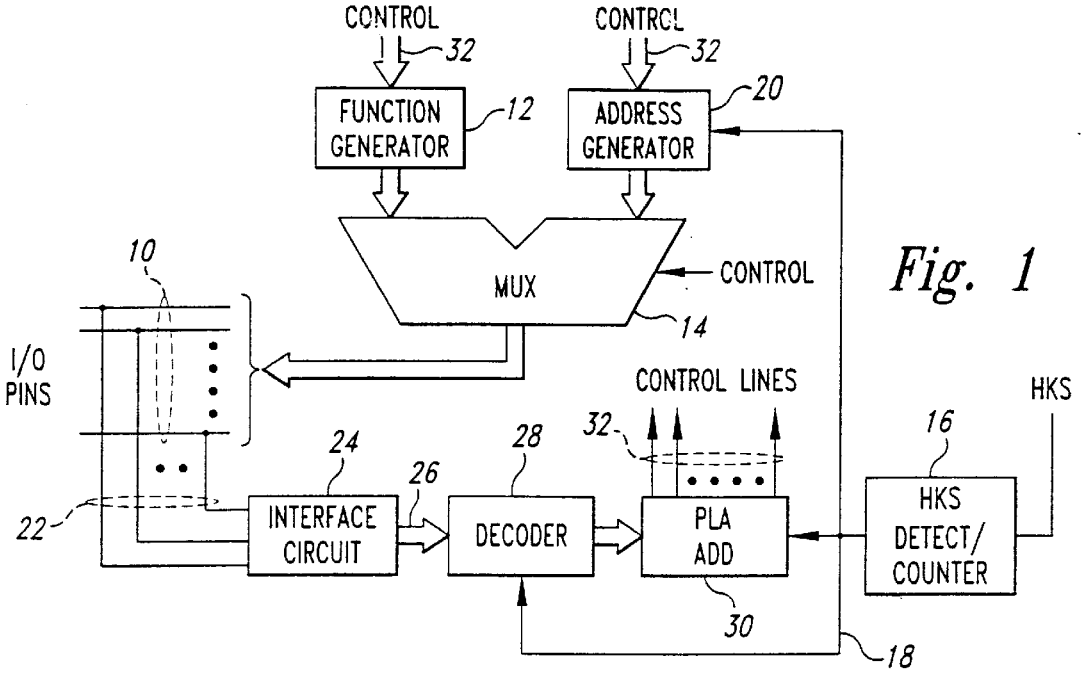
FIG. 1 illustrates a basic block diagram of the present invention;.

It will be appreciated that for purposes of clarity and where deemed appropriate, reference numerals have been repeated in the figures to indicate corresponding features in order to more clearly show important features of the present invention.

DETAILED DESCRIPTION OF THE INVENTION

Referring now to FIG. 1, there is illustrated a block diagram of the dialer of the present invention. The dialer interfaces with a switch matrix (not shown) through a plurality of input/output (I/O) pins 10. The I/O pins 10 are then scanned in accordance with the predetermined scan-logic routine to determine which of the switches in the matrix has been depressed. This is a conventional operation utilizing conventional circuitry. In normal operation, a function generator 12 is provided which interfaces with the I/O pins 10 through a multiplexer 14. The function generator 12 has the output thereof connected to one input of the multiplexer 14 and the output of the multiplexer 14 is then connected to the I/O pins 10. The function generator 12 is operable to sense which of the keys in the switch matrix has been depressed and then generate an output dialing pattern for output from the dialer (not shown). In departing from the conventional function generator, the function generator 12 of the present invention is operable to be programmed, as will be described in more detail hereinbelow, to provide the dialing function for a particular country in response to selected control input signals.

When the book switch is initially closed (i.e., off-hook condition), a hook switch signal HKS is generated. This initial action is detected by a detect/counter circuit 16 to output a control signal on a line 18 for a predetermined duration of time. This control signal is operable to initiate a programming sequence to determine a particular country dialing format each time the HKS signal is generated; that is, each time the receiver is removed from the hook switch, the dialer of the present invention is configured for a particular country in accordance with a predetermined dialing format, as will be described hereinbelow.

Once placed in the reconfiguration mode, an address generator 20 is selected as the other input of the multiplexer 14 for connection to the I/O pins 10 and the function generator 12 deselected. Therefore, the I/O pins 10 are now utilized to output addresses thereon. These addresses are selectively connected through lines 22 and interface circuit 24 to provide on the output thereof a predetermined orientation of the addresses. As will be described in detail hereinbelow, the interface circuit 24 is operable to select the combination of addresses output on the I/O lines 10 for output on a bus 26, which hardwire interface is determined by the installer. The bus 26 provides select input signals to a decoder 28 in the preferred embodiment. Thus the interface circuit 24 in the preferred embodiment comprises a hardwire interface between the I/O pins 10 and the bus 26, which hardwire interface is determined by the installer. The interface circuit 24 is operable to provide the particular configuration for a given country. The interface circuit 24 in the preferred embodiment is external to the chip.

The decoder 28 is operable to decode the addresses on the select bus 26 for output to a programmable logic array (PLA) 30. The PLA 30 is operable to receive the address and latch the address therein and then, in accordance with a predetermined addressable logic function, output control signals on a plurality of control lines 32. Each of the control lines 32 is operable to determine the function of the function generator, the control lines 32 being input to the function generator 12. The PLA 30 is therefore configured during the initial predetermined time, in response to a signal from the detect/counter circuit 16, and then the logic state thereof latched for use by the function generator 12. As described above, this address generation and decoding thereof occurs each time the hook switch signal HKS is generated. Once set up, after the programming sequence, the dialer then enters into a conventional mode and generates the particular functions for the desired country, as determined by the interface circuit 24. In order to reconfigure the dialer for a different country, it is only necessary to change the configuration in the interface circuit 24.

Referring now to FIG. 2, there is illustrated a more detailed block diagram of the preferred embodiment of the dialer of the present invention. The dialer is contained within a chip boundary 34 and the functional portion of the dialer operating in the normal operating mode generally comprises a scan logic block 36. The scan logic block 36 generally corresponds to the function generator 12 and multiplexer 14 of FIG. 1. The scan logic block 36 interfaces with four I/O terminals 38 comprising the R-terminals of an external matrix and also interfaces with four I/O terminals 40 associated with the C-terminals of an external switch matrix. The address generator 20 interfaces through a bus 42 with the scan logic block 36. The address generator 20 is operable to interface with a phase generator 44 and also with a counter 46. The counter 46 is similar in function to the detect/counter circuit 16 of FIG. 1.

The phase generator 44 is operable to generate four separate clock signals separated in phase by 90°. The four clocks are then utilized by the address generator to generate serial addresses, as will be described hereinbelow.

A select/decode circuit 48 is provided which is similar in function to the decoder 28. The select/decode circuit 48 interfaces with two I/O terminals, an A-terminal 50 and a B-terminal 52. The A and B I/O terminals 50 and 52 are a portion of the select bus 26 of FIG. 1. The output of the select/decode circuit 48 is input to the PLA 30 to generate the control signals for output on the control lines 32. The control lines 32, as described above, are then input to the scan logic block 36 to determine the particular function thereof.

In order to generate the address for the PLA 30, it is necessary to first output a separate and predetermined address on each of the R-terminals 38 and the C-terminals 40 with the address generator 20. During the initial operation sequence of the dialer that is initiated by going off-hook, as defined by the counter 46, an internal multiplexer to the scan logic block 36 selects the output of the address generator for output on the R-terminals 38 and the C-terminals 40. These are predetermined addresses, and in the preferred embodiment, comprise a series of logic "1"s and logic "0"s.

To determine or select the address, it is only necessary to connect the A-terminal 50 to one of the R-terminals 38 or the C-terminals 40 and also connect to the B-terminal 52 to one of the R-terminals 38 or the C-terminals 40. In the example illustrated in FIG. 2, a dotted line represents a hardwire connection between the A-terminal 50 and the second terminal in the R-terminals 38 through hardwire line 54. In addition, a hardwire line 56, represented by a dotted line, is connected between the B-terminal 52 and the fourth terminal in the C-terminals 40. This provides a unique address which is decoded by the select/decode circuit 48 for generating the address for the PLA 30. It is therefore only necessary for an operator to install the dialer circuit 34 with predetermined "jumpers" between the R-terminals 38 and the C-terminals 40 and one of the A-terminals 50 and B-terminals 52 to provide the appropriate address. Therefore, the dialer chip 34 is a universal dialer which can be externally programmed wherein the program for all sixteen countries is contained internal to the chip and selection of that function requires only two additional pins or terminals to the circuit. As will be described hereinbelow, the two additional terminals allow selection of one of sixteen countries and, for each country, one of four select functions for that particular country. This therefore provides the ability to select up to 64 options with only the addition of two terminals or pins on the chip 34.

The address generator 20 is operable to select the various phases of the phase generator 44 for combination thereof and output of a separate serial four-bit word on each of the R-terminals 38 and C-terminals 40. The particular sequence of logic bits is illustrated in Table 1 with the four R-terminals 48 labelled R1–R4 and the four C-terminals 40 labelled C1–C4.

TABLE I

| Terminal | Bit Value |
|---|---|
| R1 | 0111 |
| R2 | 1011 |
| R3 | 1101 |
| R4 | 1110 |
| C1 | 1000 |
| C2 | 0100 |
| C3 | 0010 |
| C4 | 0001 |

Only the three least significant bits are utilized wherein R1 has the three-bit value "111" and the C1 terminal has the bit value "000" output thereon during the initial setup. It can be seen therefore, that there are eight possible combinations if only one of the A-terminals 50 or B-terminals 52 were utilized. However, with both the A-terminal 50 and the B-terminal 52, it is possible to select the bits in such a manner as to make up a six-bit word since all possible combinations of six are present in the first three bits of the R-terminals 38 and the C-terminals 40.

By way of example, the R2 terminal 38 is selected for connection to the A-terminal 50 and the C4 terminal is selected for connection to the B-terminal 52. This would result in a selection of the three-bit value "011" for input to the A-terminal 50 and the selection of the three-bit value "001" for input to the B-terminal 52. This would result in a digital word with a value of "001011". This would constitute the address for the PLA 30 if all six bits were utilized.

In the preferred embodiment, as will be described in more detail hereinbelow, the sixteen countries are selected by selecting one of the eight values from the R-terminal 38 or the C-terminals 40 for input to the A-terminal 50 and decoding the three-bit value to determine that particular value while determining whether one of the C-terminals 40 or one of the R-terminals 38 were selected for input to the B-terminal 52. This effectively provides a four-bit word to provide sixteen combinations for the sixteen countries. Thereafter, an additional two-bits are decoded to provide additional information for each of the countries.

Figure 3:
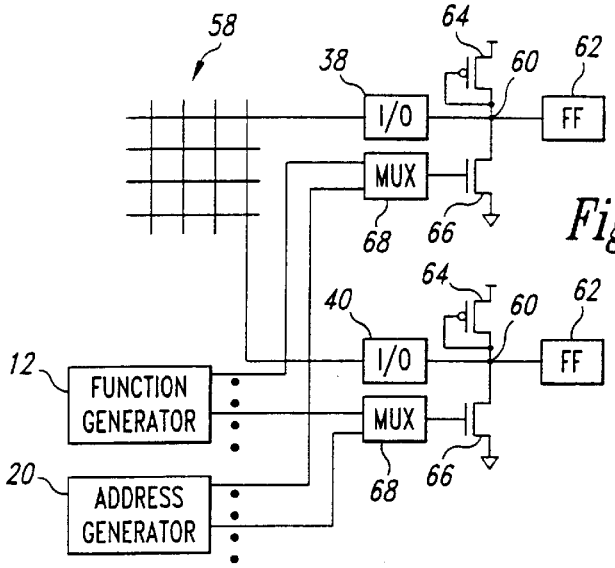
FIG. 3 illustrates a detailed diagram of the scan logic and multiplexing circuitry.

Referring now to FIG. 3, there is illustrated a more detailed diagram of the multiplexing circuit 14 that is internal to the scan logic block 36. The scan logic block 36 is interfaced with a switch matrix 58 which illustrates one connection of a horizontal line to one of the R-terminals 38 and one connection of a vertical line to one of the C-terminals 40. Each of the terminals is connected to a node 60 which is input to a flip flop 62. The flip flops 62 operate in accordance with the scan logic and are not utilized in the set-up operation. Each of the nodes 60 is connected through a P-channel load transistor 64 to a positive supply and through the source-to-drain path 66 of an N-channel transistor to ground. The gate of the N-channel transistor is operable to modulate the node 60 to provide a pin driver. The gates of each of the transistors 66 is connected through a multiplexing circuit 68 to either the function generator 12 or the address generator 20. In the normal mode of operation, the function generator 12 is operable to operate in a scan mode to determine which of the keys in the matrix 58 are depressed and then select the proper output dialing functions for the already designated country. The connections between the key matrix and the function generator 12 are not shown in FIG. 3. However, in the set-up mode, the address generator 20 is selected for outputting a serial address pattern on the associated I/O terminals 38 or 40. The pin driver therefore operates as an inverter during the set-up operation, when the keys are not depressed and the matrix 58 does not take any part in the set-up operation. Although not illustrated in FIG. 3, during set-up, a select one of the I/O terminals 38 or 40 is connected to the A-terminal 50 and the B-terminal 52.

Referring now to FIG. 4, there is illustrated a logic diagram of the phase generator 44. The phase generator 44 is operable to receive a clock CLK4 that is four times the system clock rate. The inverted and non-inverted form of a clock CLK4 is provided with an inverter 72 and is input to series-connected D-type flip flops 74 and 78 with the Q-output of flip flop 74 connected to the input of flip flop 78. The Q-bar output of flip flop 78 is connected to the D-input of flip flop 74. The set input of both flip flops 74 and 78 are connected to a signal ACCESS-bar. The flip flop 74 outputs a clock signal QL and QL-bar and the flip flop 78 outputs clock signals QM and QM-bar. The QM output is connected to one input of a four-input AND gate 80 and also to one input of a three-input AND gate 82. The QM-bar output is connected to one input of a three-input AND gate 84 and also to one input of a three-input AND gate 86. The four-input AND gate 80 has one input thereof connected to the QL output of flip flop 74, one input thereof connected to the CLK4 clock signal and one input thereof connected to the output of an inverter 88 which has the input thereof connected to the ACCESS-bar signal. The AND gate 82 has the other two inputs connected to the clock CLK4 and the QL-bar clock signal, respectively. The other two inputs of the AND gate 84 are connected to the CLK4 clock signal and the QL-bar clock signal. The AND gate 86 has the other two inputs thereof connected to the [QM-bar] *CLK4* clock signal and the QL clock signal.

The AND gate 80 has the output thereof connected to one input of a NOR gate 90, the other input thereof connected to ground. The AND gate 82 has the output thereof connected to one input of a NOR gate 92, the other input thereof connected to ground. The AND gate 84 has the output thereof connected to one input of a NOR gate 94, the other input thereof connected to ground. The AND gate 86 has the output thereof connected to one input of a NOR gate 96, the other input thereof connected to ground. The NOR gates 90–96 provide the phase generator outputs [01-bar-04-bar] *D1-bar-D4*-bar. Each of the NOR gates 90–96 are gated to a high impedance state by a P-channel transistor 98 having the source-to-drain path thereof connected between $V_{CC}$ and the gate input to the NOR gates with the gate thereof connected to ground. The phases provided are therefore equal to a pulse occurring at a rate equal to the master clock but with the leading clock edges offset by 90° from each other. The pulse width of each of the clocks [01-bar-04-bar] *D1-bar-D4-bar* is equal to one fourth of the pulse width of the master clock.

Referring now to FIG. 5, there is illustrated a logic diagram of the multiplexing circuit 68 shown in FIG. 3 and a portion of the address generator 20. The multiplexer 68 is comprised of a plurality of multiplexing circuits, each associated with one of eight outputs, four outputs associated with the R-I/O terminals 38 and four of the outputs associated with the C-I/O terminals 40. Each of these outputs drives the gate of the N-channel driver transistor 66 in the output terminal driving circuit, as described above, with reference to FIG. 3. There are four inputs Q1–Q4 which are associated with the scan logic function in the function generator 12, and these four inputs are provided in the true and the complement form, the complement form being generated by a bank of four inverters 100. In addition, phase inputs are provided from the phase generator 44. These phase inputs are PHI2-bar-PHI4-bar and the signal SS which indicates the condition of the hook switch signal HKS. Each of the signals SS and PHI2-bar-PHI4-bar are provided in the true and the complement form, the complement form being provided by a bank of inverters 102.

The outputs are divided into two groups, a first group labelled K91–K94 and a second group labelled K95–K98. The outputs K92 and K93 in the first group are associated with multiplexers comprised of a two-input NOR gate 104 having one input thereof connected to the output of a two-input AND gate 106 and the other input thereof connected to the output of a two-input AND gate 108. The output K94 in the first group and the outputs K95–K97 in the second group are each associated with a multiplexer having a two-input NOR gate 110 on the output thereof. One input of the NOR gate 110 is connected to the output of a two-input AND gate 112 and the other input thereof is connected to the output of a three-input AND gate 114. The output K91 in the first group is connected through an inverter 116 to the SS signal. The output K98 in the second group is connected to the output of a three-input NAND gate 118, one input of which is connected to the Q4 input, one input of which is connected to the Q3-bar output and the other input of which is connected to the SS-bar signal.

The output K92 has the inputs of the AND gates 106 and 108 connected such that one input of AND gate 106 is connected to the PHI4-bar signal, and the other input thereof connected to the SS signal. AND gate 108 has one input thereof connected to the Q2 output and the other input thereof connected to the SS-bar signal. The K93 output has the AND gates 106 and 108 thereof connected such that one input of AND gate 106 is connected to the PHI3-bar signal and the other input thereof is connected to the SS signal. The associated AND gate [10B] *108* has one input thereof connected to the Q1 output and the other input thereof connected to the SS-bar input. The multiplexer associated with the K94 output has one input of the two input NAND gate 112 connected to the PHI2-bar signal and the other input thereof connected to the SS input. The associated three-input AND gate 114 has one input thereof connected to the Q2-bar input, one input thereof connected to the Q1-bar input and the other input thereof connected to the SS-bar input.

In the second group of outputs, the multiplexer associated with the K95 output has the two inputs of associated AND gate 112 connected to the PHI2[-bar] input and the SS input, respectively, and the three-input AND gate 114 has the inputs thereof connected to the Q4-bar input, the Q3-bar input and the SS-bar input. In a similar manner, the multiplexer associated with the K96 output has the two inputs of associated AND gate 112 connected to the PHI3 input and the other input thereof connected to the SS inputs, respectively. The associated three-input AND gate 114 has one input thereof connected to the Q4-bar input, one input connected to the Q3 input and the other input thereof connected to the SS-bar input. The multiplexer associated with the K97 output has the two inputs of associated AND gate 112 connected to the PHI4 and the SS input, respectively. The associated three input AND gate 114 to has one input thereof connected to the Q3 input, one input thereof connected to the Q4 input and one input thereof connected to the SS-bar input.

In operation, the SS input signal is operable to select for the set-up mode when it is high and to deselect when it is low. Therefore, when the SS input signal is high, the K91 output is low and the K98 output is high and remains high. The remaining outputs are defined as a function of the phase inputs PHI2-bar-PHI4-bar. As described above, this occurs only during the set-up operation which is defined by the duration during which the SS[-bar] input signal is high.

Referring now to FIG. 6, there is illustrated a logic block diagram of the select/decode circuit 48 and PLA 30 of FIG. 2. Included in FIG. 2 are two inputs, an SELB input and an SELA input, the SELB input being input on the B terminal 52 and the SELA input being input on the A terminal 50. The SELB input is connected to one input of a two-input OR gate 120, the output of which is connected to one input of a two-input NAND gate 122. The other input of the OR gate 120 is connected through an inverter to a test circuit (not shown) which is always low during the set-up operation. The other input of NAND gate 122 is connected to the output of a four-input NAND gate 124. NAND gate 124 has four inputs connected to various clock signals, one input connected to a CLK input, one input connected to a CLK8 signal and one input connected to a clock signal ENSS, which is generated during the set-up operation.

During the set-up operation, the test signal is low such that the output of OR gate 120 is always high, the SELB signal in line 52 not affecting the output of OR gate 122. This results in NAND gate 122 having an output that is a function of the clock signals on the output of NAND gate 124. Since the other input signals are high during set-up, the output of NAND gate 122 is the CLK4 signal. The clock signal output by NAND gate 122 is input to the clock input of another three series-connected D-type flip flops 126, 128 and 130 and also to the clock input of three series-connected D-type flip flops 132, 134 and 136. The D-type flip flops 126–130 are configured such that the Q output of flip flop 126 is connected to the D-input of flip flop 128 and the Q-output of flip flop 128 is connected to the D-input of flip flop 130. The SELA signal on line 50 is connected to the D-input of flip flop 126.

In a similar manner, the flip flop 132 has the Q-output thereof connected to the D-input of flip flop 134 and the Q-output of flip flop 134 is connected to the D-input of flip flop 136. The D-input of flip flop 132 is connected to the output of a NAND gate 138. NAND gate 138 has one input thereof connected to the output of an OR gate 140 and the other input thereof connected to the input of an OR gate 142. OR gate 140 has one input thereof connected through an inverter 144 to the test signal and the other input thereof connected to the Q-bar output of flip flop 130. The OR gate 142 has one input thereof connected to the test input and the other input thereof connected to the SELB input on line 52. When the test signal is low and prior to the Q-bar output of flip flop 130 going high, the output of OR gate 140 is always high and the output of OR gate 142 is determined by the logic state of SELB on line 52.

The flip flops 126–130 are operable to store the three-bit value of the serial address input on the SELA terminal 50. In a similar manner, the three flip flops 132–136 are operable to store the serial address value input on the SELB terminal 52. The Q and Q-bar outputs of the flip flops 126–130 are input to an option select PLA to provide a one of eight selection. In a similar manner, the three flip flops 132–136 have the Q-bar outputs thereof input to a decode circuit 148 which has the true and complement form thereof input to the option select PLA 146. The decode circuit 148 essentially decodes whether the three-bit value in the flip flops 132–136 correspond to one of the four values on either the R-terminals 38 or the C-terminals 40. The decode circuit 148 is comprised of three two-input OR gates, the outputs thereof connected to the inputs of a three-input NAND gate. The output of the three input NAND gate providing the output of the decode circuit 148. The first and second OR gate in the decode circuit 148 have one input thereof connected commonly to the Q-bar output of flip flop 132. The first and third OR gates have one input thereof commonly connected together to the Q-bar output of flip flop 134. The second and third OR gates have one output thereof connected in common to the Q-bar output of flip flop 136. Therefore, whenever there are at least two zeros stored in flip flops 132–136, the output of the decode circuit 148 will be a logic low. This will indicate that the received address is one of the address values generated by the C-terminals 40 and, whenever there are at least two logic "1"s stored in flip flops 132–136, the output decode circuit 148 will be a logic high, indicating one of the address values output by the R-terminal 38. Therefore, decode circuit 148 detects whether the PLA address input is connected to the R-terminals 38 or the C-terminals 40, providing an additional bit of information. In combination with the SELA address, this provides a four-bit address input to the option select PLA 146.

The option select PLA 146 is operable to provide sixteen outputs on bus 32 indicating sixteen different country codes or sixteen selections. This information is then output to the function generator 12 to determine the various parameters for the output dialing format for that particular country.

In operation, generation of the HKS signal upon removing the receiver from the hook results in a reset signal being sent to each of the six flip flops 126–138 to set the Q-output thereof low and the Q-bar output thereof high. This is facilitated through the HKS input being connected to each of the reset inputs on the flip flops 126–136 through a line 150. In addition, the ENSS signal is generated which is an enable signal for the set-up mode. As described above, a counter 46 is initiated which is operable for four clock cycles to generate the addresses from the address generator 20 and output these on the R-terminal 38 and the C-terminal 40 through the hardwired connections 54 and 56 to the SELB terminal 52 and the SELA terminal 50. This occurs until the counter 46 has timed-out, at which time the ENSS signal goes low and the data is latched as an address to the option-select PLA 146. This operation occurs each time the receiver is lifted such that any errors or glitches that occur in the address stored in the flip flops 126–138 will be corrected for. This is essentially an automatic reset operation.

In order to generate more address bits, the data stored in the flip flops 132–136 is further decoded by two exclusive OR gates 152 and 154. Exclusive OR gate 152 has one input thereof connected to the Q-output of flip flop 134 and the other input thereof connected to the Q-output of flip flop 136. In a similar manner, exclusive OR gate 154 has one input thereof connected to the Q-output of flip flop 132 and the other input thereof connected to the Q-output of flip flop 136. Exclusive OR gates 152 and 154 provide an additional two-bits of address information which is utilized for separate functions for the selected country in the option select PLA 146. Therefore, it can be seen that the additional two terminals 50 and 52 have allowed a total addressing capability of sixty-four options, although all sixty-four of these options were not utilized.

Referring now to FIG. 7, there is illustrated a block diagram of the counter 46 that is comprised of binary counter 160 which has a plurality of binary outputs for generating a binary count value. The counter is controlled by the master clock and also a reset signal. The reset signal is generated initially upon receipt of the HKS signal when the initial set-up operation is begun. This reset signal resets the counter to a value of zero on all outputs thereof and also resets the Q-bar output of a latch 162 to a logic "1". The latch 162 has the clock input thereof connected to the master clock and also has the data input thereof connected through a two-input AND gate 164 to the first two bits of counter 160. Therefore, when the counter 160 has counted four values, a one is present on both inputs of the AND gate 164 resulting in a one on the data input of latch 162. When this logic one is clocked through to the Q-bar output thereof as a logic "0", it will remain latched there until reset. The latch 162 is therefore operable to latch the SS signal low after four counts. Therefore, the latch 162 is operable in conjunction with the counter 160 to allow the set-up operation to be initiated during the first four counts of the counter 160. This is in response to a reset operation which occurs whenever the hook switch is closed.

In summary, there has been provided an address scheme for a dialer. The address scheme utilizes an internal multiplexing circuit for multiplexing internal pins to output an internally generated address for a hardwire connection to other pins on the circuit. The predetermined address patterns that are output during a program mode are selectively hardwired to the decode pins with the decode operation recovering the internally generated address for input to a PLA. The output of the PLA provides control lines for determining the final function of the dialer. Therefore, the internal address generator allows selection between a plurality of functions with only a minimum number of additional pins required for this feature.

Although the preferred embodiment has been described in detail, it should be understood that various changes, substitutions and alterations can be made therein without departing from the spirit and scope of the invention as defined by the appended claims.

What is claimed is:

1. A programmable control circuit, comprising:

a plurality of input/output pins;

an address generator for generating a separate and predetermined serial address for each of said input/output pins;

a function generator for interfacing with said input/output pins to perform a predetermined function;

a multiplexer circuit for selecting said function generator when in a normal mode of operation or said address generator when in a set-up mode of operation to interface with said input/output pins;

a plurality of address input pins having a number less than that of said plurality of input/output pins;

interface means for interfacing select ones of said input/output pins with select ones of said address input pins;

decode means for decoding and latching said addresses received on said address input pins during said set-up operation;

an addressable control signal generator for outputting a separate and predetermined control signal for each decodable address, said predetermined control signals utilized by said function generator; and control means for generating a set-up signal to control said multiplexer to select said address generator and to control said decode means for decoding and latching said received addresses on said input address pins.

2. The control circuit of claim 1 wherein said function generator performs a predetermined number of functions, each function selected by one of said control signals output by addressable control signal generator.

3. The control circuit of claim 1 wherein said address generator, function generator, multiplexer, decode means, addressable control generator and control means are contained with the boundaries of a package and said input/output pins and address input pins interface between the interior of said package and the exterior thereof, and said interface means is on the exterior thereof.

4. The control circuit of claim 1 wherein said interface means comprises a plurality of hardwire interconnections selectively connected between select ones of said address input pins and select ones of said input/output pins.

5. The control circuit of claim 4 wherein each of said address input pins is connected to a select one of said input/output pins.

6. The control circuit of claim 1 wherein said decode means comprises means for receiving the serial address and decoding said serial address to output a parallel address for input to said control signal generator.

7. The control circuit of claim 1 wherein said control signal generator comprises a programmable logic array having an address input and a control signal output, each control signal output activated in response to an associated address being input to the address input thereof.

8. The control circuit of claim 1 wherein said control means comprises:

a counter for providing a predetermined count and initiated upon receiving an external set-up signal; and means for generating an internal set-up signal during the operation of said counter, said internal set-up signal utilized to control said multiplexer, said address generator and said decode means during the set-up operation and inhibit the operation of said function generator during this operation, said counter means initiating said internal set-up operation upon the occurrence of said external set-up signal.

9. The control circuit of claim 1 wherein said input/output pins are divided into at least two groups and said address input pins comprise at least two address input pins, said predetermined addresses being binary addresses, said decode means comprises a serial-to-parallel converter for converting the received binary address on a first one of said address input pins to provide a parallel binary address and means for determining which of said first and second groups of said input/output pins was connected to said second of said address input pins to provide an additional binary bit of address information for input to said control signal generator.

10. A method for generating control signals with a minimum number of pins on a given package, comprising:

generating an internal function for operation in a normal operation mode to interface through a plurality of input/output pins to an exterior of the given package;

generating a separate and predetermined serial address for each of the input/output pins during a set-up operation;

selectively interfacing each generated serial address with the input/output pins during the set-up operation and the generated internal function with the input/output pins during the normal operation;

externally connecting select ones of the input/output pins to address input pins, the address input pins having a number less than the plurality of input/output pins;

decoding and latching a received address on the address input pins during the set-up operation;

generating a separate and predetermined control signal for each of said predetermined serial address received, the control signals then utilized to control the function generation; and controlling with a control circuit to set an operate mode of either the set-up operation mode or the normal operation mode.

11. The method of claim 10 wherein the step of generating an internal function comprises generating one of a plurality of functions, each of the functions associated with each of the control signals and the one of the plurality of functions generated is generated in response to generation of the control signal.

12. The method of claim 10 wherein the step of interfacing comprises hardwiring a select one of the input/output pins to a select one of the address input pins.

13. The method of claim 12 wherein the step of hardwiring comprises hardwiring each of the address input pins to a select one of the input/output pins.

14. The method of claim 10 wherein the predetermined addresses are binary addresses and the step of decoding comprises converting at least a portion of the received address from a serial address to a parallel address.

15. The method of claim 10 wherein the step of controlling comprises:

initiating the control set-up operation in response to receiving the external set-up signal; and terminating the set-up operation after a predetermined duration of time such that the set-up operation is initiated each time the external set-up signal is received.

*16. A programmable dialer control circuit having a programming mode of operation and a normal mode of operation, and a plurality of pins, wherein said control circuit is programmed by the presence or absence of hardwired connections on said plurality of pins, and said plurality of pins having other hardwired connections which convey information to the control circuit during said normal mode of operation.*

*17. The programmable dialer control circuit set forth in claim 16 wherein the operation of said control circuit during said normal mode of operation is determined, at least in part, during said programming mode of operation.*

*18. The programmable dialer control circuit set forth in claim 16 wherein said hardwired connections used to program the Programmable control circuit are also connected to at least one additional input pin of the programmable control circuit.*

*19. The programmable dialer control circuit set forth in claim 16 wherein said program mode of operation is of a predetermined duration and initiated upon receipt of an external signal.*

*20. The programmable dialer control circuit set forth in claim 16 wherein said other hardwired connections are input/output pins.*

*21. The programmable control circuit set forth in claim 20 wherein during said programming mode an address is generated in said dialer and placed on said plurality of pins and passed through said hardwired connections and received at another of said plurality of pins.*

*22. A method for generating control signals in a dialer control circuit comprising the steps of:*

*a) placing said control circuit into a programming mode of a predetermined duration upon receipt of an external signal;*

*b) Programming said control circuit, said programming being determined by external hardwired connections to a plurality of pins at the exterior of a chip containing said control circuit; and*

*c) generating an internal function for operation in normal mode to thereby provide control signals, said internal function being dependent on the programming of said control circuit, and said internal function also being dependant on the information conveyed on other hardwired connections to said plurality of pins.*

*23. The method for generating control signals in a dialer control circuit as set forth in claim 22 wherein said programming is determined by hardwired connections from at least one of said plurality of pins to at least one other input pin of said chip, and further including the step of generating and coupling a serial address out of said at least one of said plurality of pins and into said at least one other input pin during the step of programming said control circuit.*

*24. A dialer with an internal option select circuit programmed with at least one external hardwired connection.*

*25. The dialer set forth in claim 24 wherein said internal option select circuit selects dialing parameters of the dialer such that, depending on the programming of said internal option select circuit, dialing parameters of one of a plurality of countries can be selected.*

*26. The dialer set forth in claim 24 wherein said at least one external hardwired connection is connected to at least one input pin of the dialer.*

*27. The dialer set forth in claim 26 wherein said at least one external hardwired connection is connected to one input pin of the dialer.*

*28. The dialer set forth in claim 26 wherein said at least one external hardwired connection is also connected to an additional input pin of the dialer.*

*29. The dialer set forth in claim 28 wherein said internal option select circuit is programmed during a set-up mode of the dialer, and during said set-up mode, a serial address is generated in the dialer and placed on said at least one input pin of the dialer, said serial address also being passed through said at least one external hardwired connection and received at said additional input pin of the dialer.*

*30. The dialer set forth in claim 24 wherein said internal option select circuit is programmed during a set-up mode of the dialer.*

*31. A dialer having a normal mode of operation and a program mode of operation, said program mode of operation being of a predetermined duration and initiated upon receipt of an external set-up signal.*

*32. The dialer set forth in claim 31 wherein said external set-up signal is a hook switch signal.*

*33. The dialer set forth in claim 31 wherein during said program mode of operation the dialer becomes configured for a particular country such that during said normal mode of operation, and upon receipt of an external signal, the dialer provides a predetermined dialing format for said particular country.*

*34. The dialer set forth in claim 31 wherein the dialer is embodied on a chip, and during said program mode of operation the dialer determines, by hardwired connections to the dialer which are external to the chip, a set of functions which the dialer will perform during said normal mode of operation.*

*35. The dialer chip set forth in claim 34 wherein at least one of said external hardwired connections is connected to at least one input pin of the dialer chip.*

*36. The dialer chip set forth in claim 35 wherein said at least one external hardwired connection is also connected to an additional input pin of the dialer chip.*

*37. The dialer chip set forth in claim 35 further including an internal option select circuit is programmed during a set-up mode of the dialer chip, and during said set-up mode, an address is generated in the dialer chip and placed on said at least one input pin of the dialer chip, said address also being passed through said at least one external hardwired connection and received at said additional input pin of the dialer chip.*

*38. A dialer which performs a set-up operation upon receipt of a hook switch signal.*

*39. The dialer set forth in claim 38 wherein an internal option select circuit is programmed during said set-up operation.*

*40. The dialer chip set forth in claim 39 wherein said internal option select circuit selects dialing parameters of the dialer such that, depending on the programming of said internal option select circuit, the dialing parameters of one of a plurality of countries can be selected.*

*41. The dialer chip set forth in claim 39 wherein at least one external hardwired connection is connected to at least one input pin of the dialer chip.*

*42. The dialer chip set forth in claim 41 wherein said at least one external hardwired connection is connected to one input pin of the dialer chip.*

* * * * *